Jan. 10, 1956
C. L. HYDE
2,730,088
ROTARY VALVE-TYPE ENGINE
Filed Aug. 12, 1954
3 Sheets-Sheet 1
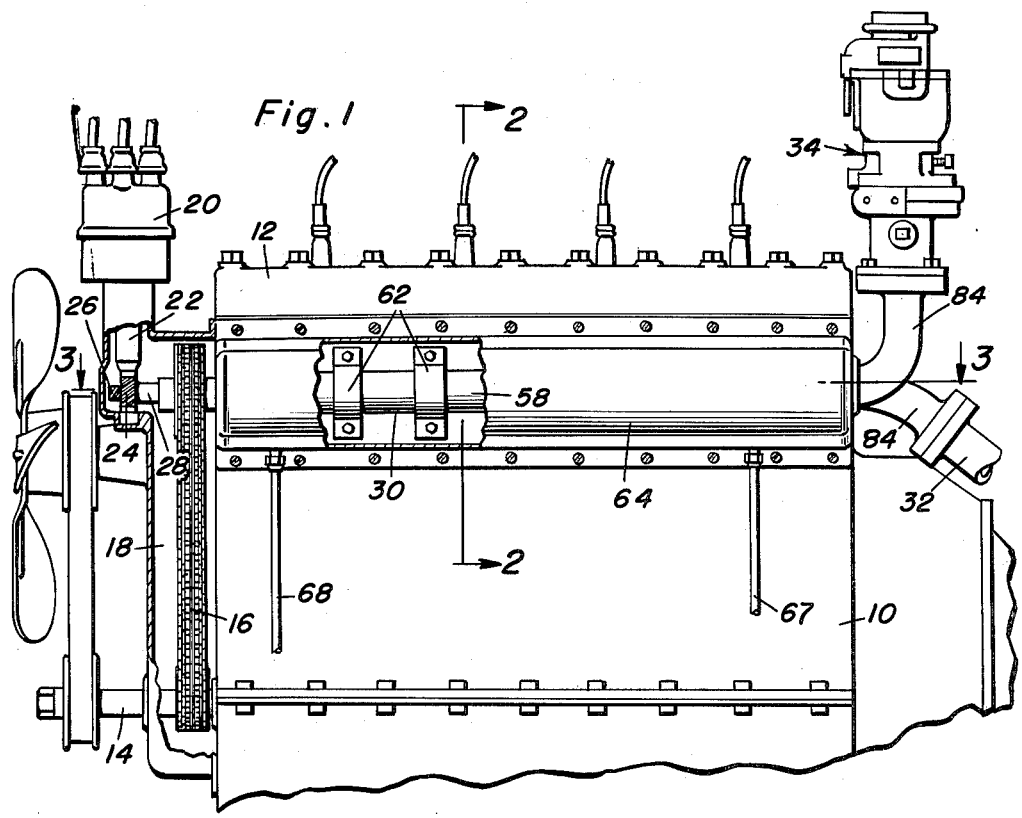
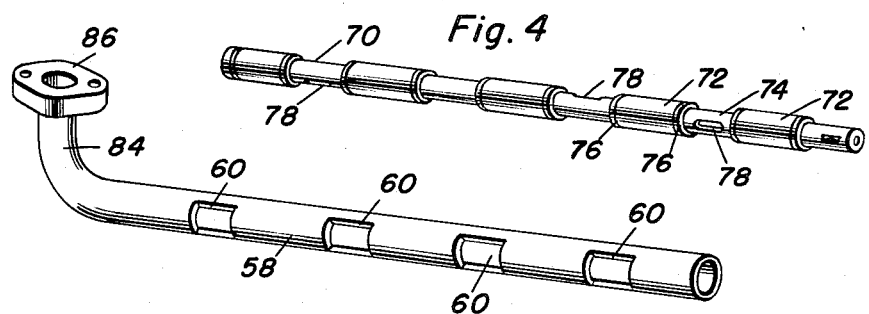
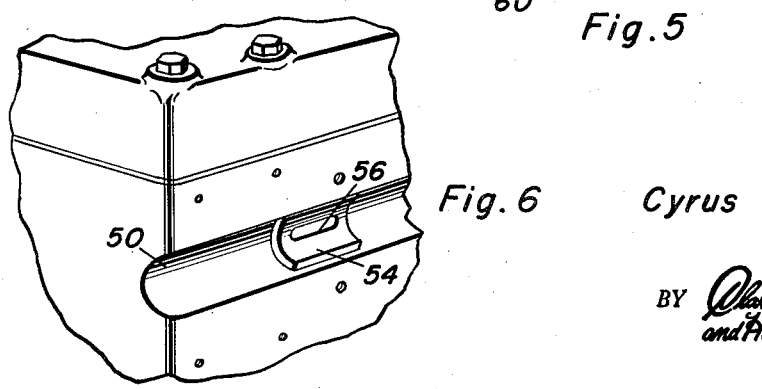
Cyrus L. Hyde
INVENTOR.
BY *Clarence A. O'Brien*
*and Harvey B. Jacobson*
Attorneys Jan. 10, 1956    C. L. HYDE    2,730,088
ROTARY VALVE-TYPE ENGINE
Filed Aug. 12, 1954    3 Sheets-Sheet 2

Cyrus L. Hyde
INVENTOR.

BY Clarence A. O'Brien
and Harvey B. Jackson
Attorneys

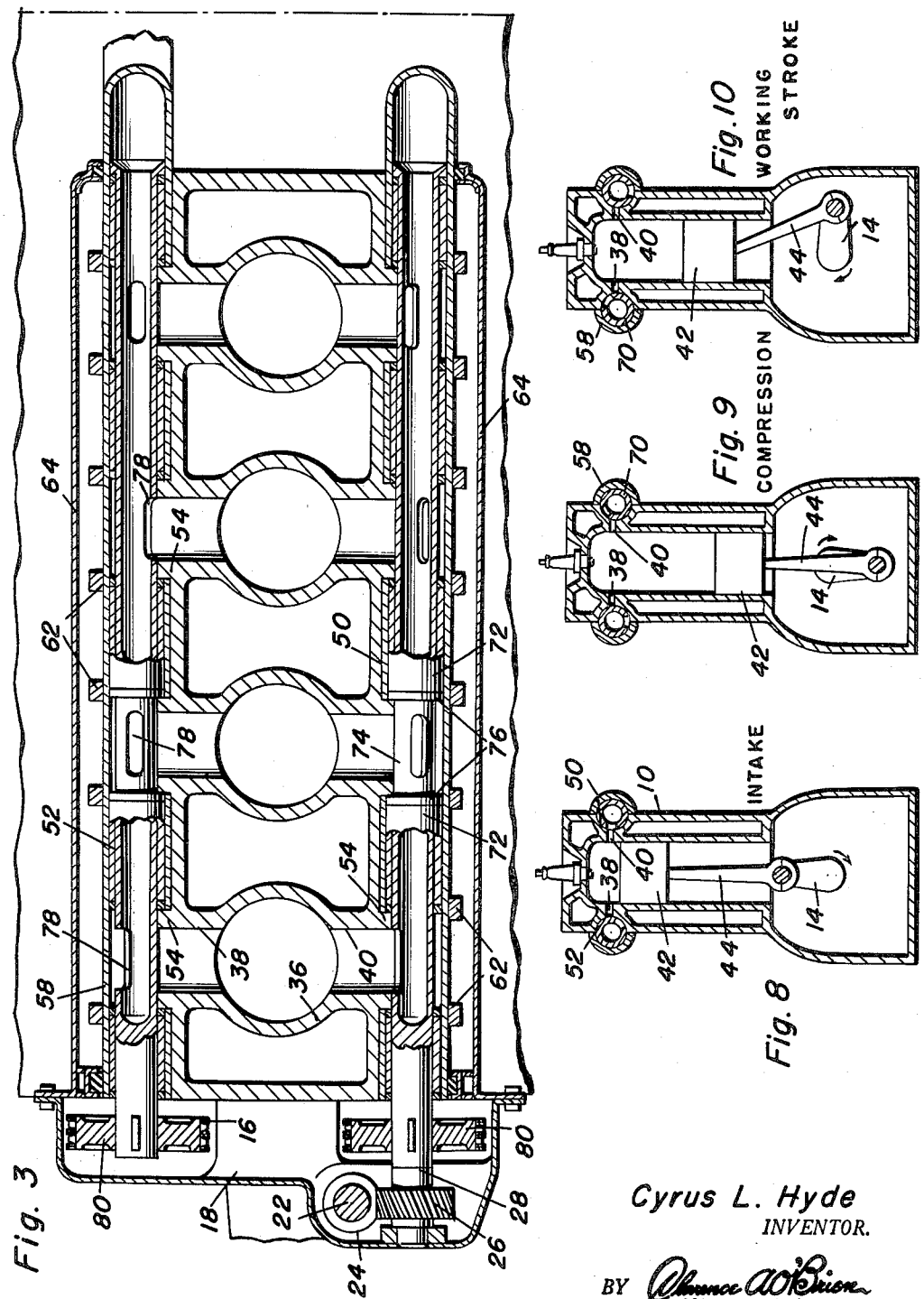

United States Patent Office 2,730,088
Patented Jan. 10, 1956

2,730,088

ROTARY VALVE-TYPE ENGINE

Cyrus L. Hyde, Camarillo, Calif., assignor of one-half to Hamilton D. Hazlehurst, Camarillo, Calif.

Application August 12, 1954, Serial No. 449,367

3 Claims. (Cl. 123—59)

This invention comprises novel and useful improvements in a rotary valve-type engine and more specifically pertains to an internal combustion engine having an improved rotary valve construction for controlling the flow of gases through the intake and exhaust passages of the engine.

The principal object of this invention is to provide in an internal combustion engine an improved rotary valve construction.

A further object of the invention is to provide an improved rotary valve construction for internal combustion engines which shall have an advantageous and highly efficient cooling system for the same.

A still further object of the invention is to provide an improved rotary valve construction for internal combustion engines wherein the ignition, timer and distributor may be directly connected with a rotary valve to facilitate and maintain accurate timing of the ignition with respect to the valve operation.

A still further important object of the invention is to provide in an internal combustion engine a rotary valve construction wherein the engine block itself forms a part of the seat of the rotary valve and wherein the removable portion of the seat and journals for the rotary valve are encased in a cooling jacket.

Another object is to provide a valve assembly for internal combustion engines wherein a precise and positive control and timing of the fuel and exhaust ports may be effected and wherein the number of parts of the valve mechanism may be reduced to a minimum.

An additional object is to provide unitary valve assemblies for the exhaust and fuel supply systems of the entire engine block to thereby facilitate replacement, servicing and repair of the valve assembly.

Yet another very important object, and a fundamental purpose of the invention is to provide a valve assembly which will admit of an improved flow of the gases into and from the cylinders; and which shall be so positioned externally of the cylinders so as to avoid any interference with the piston travel and permit the use of smaller piston clearances enabling a greater choice of compression ratios.

And a final important object of the invention to be specifically enumerated herein resides in the provision of a rotary valve construction having an improved passage and port arrangement for the stationary and rotatable members of the valve assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a portion of a conventional internal combustion engine, parts being broken away, and showing the novel valve construction of this invention applied thereto;

Figure 3 is a horizontal enlarged sectional view taken substantially upon the plane indicated by the section line 3—3 of Figure 1;

Figure 4 is a perspective view of the inner, rotor member of the rotary valve assembly;

Figure 5 is a perspective view of the stationary outer member of the rotary valve assembly;

Figure 6 is a fragmentary detail view in perspective showing a portion of an engine block and the valve port and seats therein;

Figure 8 is a diagrammatic view similar to Figure 2, on a smaller scale but showing the position of the valves at the beginning of the intake stroke of the engine;

Figure 9 is a view similar to Figure 8 but showing the position of the valves at the start of the compression stroke of the engine; and, Figure 10 is a view similar to Figure 2, on a smaller scale showing the position of the parts during the working stroke of the engine.

Figure 2:
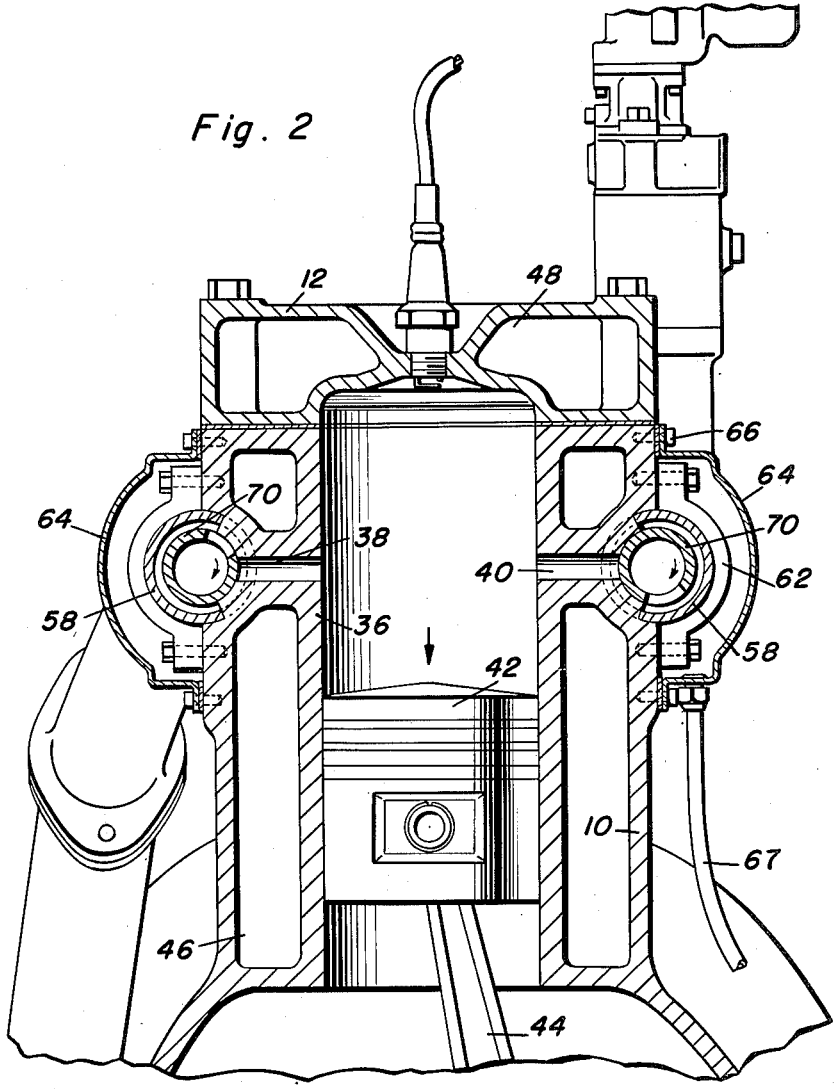
Figure 2 is a vertical transverse sectional view taken upon an enlarged scale substantially upon the plane indicated by the section line 2—2 of Figure 1, the position of the intake and exhaust rotary valves being shown during the working stroke of the engine piston.

At the outset it should be understood that the novel and improved rotary valve construction disclosed and described hereinafter has been illustrated as applied to an engine of the in-line type, although it will be understood that the invention is equally applicable to various other types of engines such as the V-type, the opposed cylinder type, the radial type and the like.

Referring first to Figure 1 it will be seen that there is disclosed a conventional form of internal combustion engine having a cylinder block 10 with a removable cylinder head 12, a crankshaft 14 which is connected by a driving and timing chain arrangement 16, disposed in a casing 18 at the front of the engine and for driving the rotary valve assemblies forming the subject of this invention.

The engine further includes a conventional ignition timer 20 whose driving shaft 22 is provided with a spiral gear 24 which is connected to and driven by the spiral gear 26 upon the extremity 28 of one of the rotary valve members 30.

Still further, the engine includes the usual exhaust pipe 32 and carburetor 34 by which the exhaust products are discharged from the engine and the combustible mixture is introduced thereinto through the novel valve assembly to be now described.

Referring more particularly to Figures 2 and 3 and 8–10 it will be seen that the cylinder block includes a plurality of cylinder bores 36, each of which is provided with an exhaust passage 38 and a fuel inlet passage 40. Reciprocable within the cylinders are pistons 42 which are connected by connecting rods 44 with the crank shaft 14 previously mentioned. Suitable water jacketing chambers 46 and 48 are provided in the cylinder block about the cylinders and in the cylinder head.

In accordance with this invention the flow of exhaust gases through the exhaust passages 38 and the ingress of a combustible mixture through the inlet passage 40 are controlled by a pair of rotary valve assemblies which are of identical construction except for certain minor differences which will be set forth hereinafter.

Upon its opposite sides the cylinder block 10 is provided with a semi-cylindrical recess or channel 50 and 52 for the intake and exhaust valves respectively, each of these passages is provided with a semi-cylindrical boss 54, see Figures 6 and 3, which has an elongated slot forming a port as at 56. Each of slots 56 and each boss 54 is in communication with one of the passages 38 or 40, and the recess 50 extends the length of the engine and communicates with all of the passages upon one side of the engine. The semi-cylindrical recess 50 or 52 forms a seat in which is stationarily secured the stationary tubular outer casing or sleeve 58. The latter along one side is provided with cut away portions or recesses 60, each of which is adapted to receive a boss 54, whereby the passages 38 or 40 will communicate through the ports 56 with the interior of the stationary sleeve 58. The stationary sleeve 58 is retained in the seat formed by the semi-cylindrical recess 50 by means of clamps 62. Surrounding each of the stationary sleeves 58 and their clamps is a semi-cylindrical casing or housing 64, which loosely surrounds the sleeve and which is detachably secured to the cylinder block as by fastening bolts 66. Each of the casings 64 for the inlet and exhaust valve assemblies constitutes a water jacket for the same, and water may be circulated therethrough in any desired manner, as for example by pipe connections 67 and 68 which are also connected in any suitable location with the water jacket of the engine for the introduction of coolant to the water jackets for the valve assemblies and the discharge of coolant therefrom. Thus, as illustrated, a cooling circulation of water from the engine cooling system is maintained through the valve assemblies to insure a safe operating temperature therefor.

Referring now more specifically to the rotor member of the valve assemblies, as seen in Figures 3 and 4, it will be apparent that the same is composed of a tubular shaft 70 having alternate longitudinally spaced enlarged and reduced cylindrical portions 72 and 74 respectively. Each of the enlarged portions 72 is adapted to have a snug rotating and sliding fit within the interior of the stationary sleeve 58, and adjacent the ends of each portion 72 there is provided conventional sealing rings 76. As shown in Figure 3 the arrangement is such that when the rotor is in place in the stationary sleeve 58, the reduced portions 74 will be disposed adjacent each of the valve ports in one of the bosses 54, while the rings will be positioned on opposite sides of the port in each boss, and on opposite sides of the boss in order to establish a gas tight seal with the same.

The sleeve 70 is provided with a plurality of inlet ports 78, one being provided in each of the diametrically reduced portions 74, which ports are adapted to establish communication with the port 56 in the boss 54 of the inlet and exhaust passages 38 and 40, in properly timed relation upon the rotation of the sleeve, as will be readily understood by those skilled in the art.

As shown in Figure 3, one end of the rotary sleeve 70 of the inlet and exhaust valve assemblies is extended into the valve gearing chamber 18, and suitable pulleys 80 are secured thereto for connection with the above mentioned timing and driving chain 16. Further, the rotary sleeve of the inlet valve element has the extension 28 attached thereto in any suitable manner, whereby the gear 26 will be positively connected to the valve, and through the timing chain 16 to the other valve assembly in order to insure that the ignition timing will be driven in synchronization with the inlet and exhaust valves.

The two valve rotors 70 at the opposite end from that carrying the driving pulleys 80, are open, and communicate with the curved extremity 84 at one end of the stationary sleeve 58. This extremity is provided with a flanged connection 86 whereby in that stationary sleeve 58 which is to be employed for the exhaust valve assembly, a connection may be made with the exhaust pipe 32; and that sleeve which is to be employed with the intake valve assembly may be connected with a carbureter 34.

Figure 7:
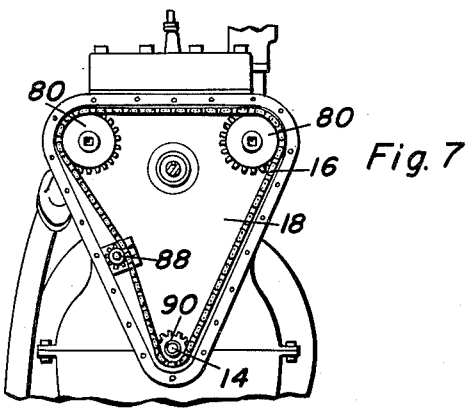
Figure 7 is a fragmentary front elevational view of a portion of the engine of Figure 1 showing the driving mechanism of the valve shafts, the valve gearing compartment having its cover plate removed therefrom.

As further shown in Figure 7 a conventional form of slack take-up device indicated generally by the numeral 88 is provided within the gearing chamber 18 for properly tensioning the driving chain.

The driving chain is driven from a gear 90 on the crankshaft 14 in such manner that the crankshaft rotates at twice the speed of the rotary valves.

As will be understood by a comparison of the positions of the valves with the piston positions in the diagrammatic views of Figures 8–10, the engine illustrated is of the four-cycle type whereby each valve makes one complete revolution for two rotations of the crankshaft.

It is however quite possible by using a one to one gearing ratio between the crankshaft and the valve shafts and by properly positioning the valve ports of the valve rotors to also employ the intake and exhaust rotary valve assemblies with a two-cycle engine.

The arrangement illustrated is of a very simplified construction, establishing effective sealing action between each of the ports in the cylinder block and the corresponding ports of the rotary element of the valve; in providing an extended journaling area for the rotor of the valve in the stationary casing thereof; in providing a considerably superior cooling action upon the valve assemblies; in providing a readily attached or disconnected valve assembly which will facilitate installation, servicing or repairs; and in providing an improved positive driving connection with the ignition system of the engine to insure the maintaining of proper timing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an internal combustion engine, a cylinder block having a plurality of cylinders, a semi-cylindrical recess in one side of said block extending longitudially thereof, passages in said block connecting said recess with each of said cylinders, a stationary sleeve seated in said recess and having apertures, each of said passages having a bored boss extending into one of said apertures, a rotary sleeve journaled in said stationary sleeve, said rotary sleeve having ports each registering with one of said bored bosses upon rotation of said rotary sleeve, means sealing the interior of the rotary sleeve from the interior of the stationary sleeve, a fluid conduit communicating with said rotary sleeve.

2. The combination of claim 1 wherein said rotary sleeve has alternate cylindrical enlarged and reduced portions, said reduced portions having said ports therein, said enlarged portions having sealing rings on opposite ends of the reduced portions for sealing the valve ports from each other and from the interior of the stationary sleeve.

3. The combination of claim 1 wherein said rotary sleeve has alternate cylindrical enlarged and reduced portions, said reduced portions having said ports therein, said enlarged portions having sealing rings on opposite ends of the reduced portions for sealing the valve ports from each other and from the interior of the stationary sleeve, said bosses having concave faces engaging the reduced portions.

References Cited in the file of this patent

UNITED STATES PATENTS

| | | |
|---|---|---|
| 1,109,681 | Judson | Sept. 8, 1914 |
| 1,251,769 | Grove | Jan. 1, 1918 |
| 1,443,035 | Olson | Jan. 23, 1923 |
| 1,774,881 | Fry | Sept. 2, 1930 |
| 2,257,631 | Wahlberg | Sept. 30, 1941 |

FOREIGN PATENTS

| | | |
|---|---|---|
| 25,648 | Great Britain | Nov. 27, 1908 |
| 420,770 | France | Dec. 3, 1910 |
| 468,950 | France | May 7, 1914 |